United States Patent

[11] 3,596,875

| [72] | Inventors | John R. Couper<br>Loveland;<br>Myer J. Schaffner, Arvada, both of, Colo. |
|---|---|---|
| [21] | Appl. No. | 7,139 |
| [22] | Filed | Jan. 30, 1970 |
| [45] | Patented | Aug. 3, 1971 |
| [73] | Assignee | E-Z Serve, Inc.<br>Arvada, Colo.<br>by said Couper |

[54] REMOTELY CONTROLLED FLUID VALVE
7 Claims, 4 Drawing Figs.

[52] U.S. Cl. ................................... 251/294,
74/504, 251/110, 251/313
[51] Int. Cl. .................................... F16k 5/00
[50] Field of Search ........................... 251/101,
110, 294, 313; 74/504

[56] References Cited
UNITED STATES PATENTS
| 31,799 | 3/1861 | Graham | 251/313 X |
| 657,059 | 8/1900 | Broomell | 251/110 X |
| 1,557,390 | 10/1925 | Tolk et al | 251/294 X |
| 3,355,964 | 12/1967 | Day | 251/294 X |

FOREIGN PATENTS
| 149,989 | 6/1924 | Great Britain |
| 313,845 | 6/1956 | Switzerland |

*Primary Examiner*—Henry T. Klinksiek
*Attorney*—Richard D. Law

ABSTRACT: A remotely controlled fluid valve includes a rotatable valve member movable toward and away from a valve seat in the valve by rotation thereof, an elongated, flexible, rotatable member is secured to and extends from the stem of the valve providing means for rotating the valve member, thereby opening and closing the valve member on the valve seat. The unit may have the flexible rotatable member extending through a wall or other partition to provide a manually operated remotely controlled valve for hazardous locations and/or fluids. The valve member is readily biased into closed position.

Patented Aug. 3, 1971
3,596,875
FIG. 1
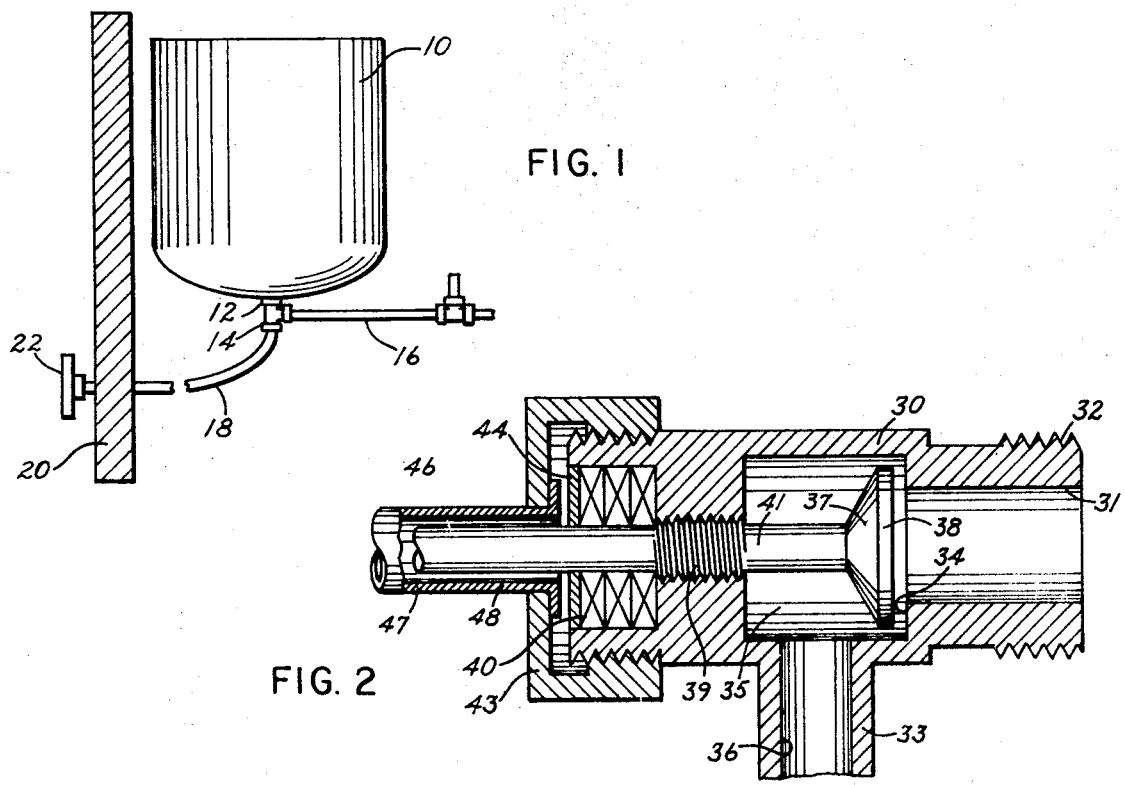
FIG. 2
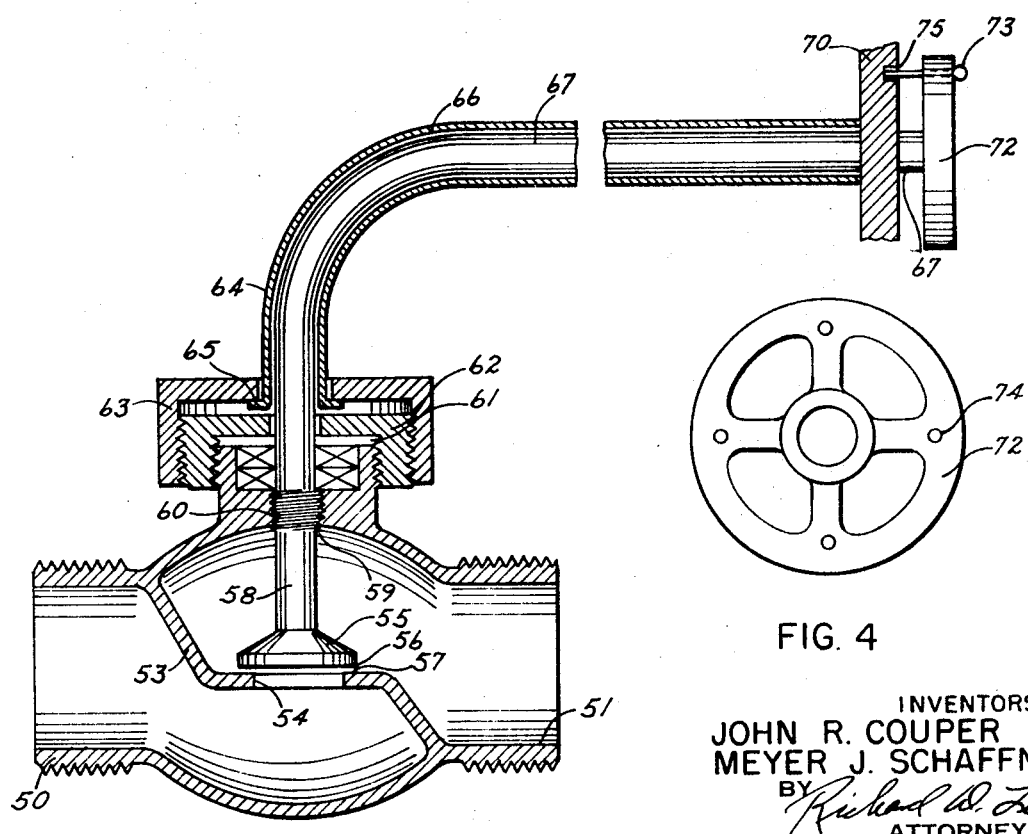
FIG. 3
FIG. 4
INVENTORS
JOHN R. COUPER
MEYER J. SCHAFFNER
BY
ATTORNEY

REMOTELY CONTROLLED FLUID VALVE

Remotely controlled valves, using electronic, hydraulic or pneumatic powered actuators for opening and closing the fluid lines, have been known. Most generally the actuating motor is located adjacent the valve, and is subject to the atmosphere around the valve. Any breakdown of the actuating means requires the presence of a person in the atmosphere surrounding the valve. If the atmosphere around the valve is classified as hazardous, there is or may be an unnecessary risk on the maintenance man during the repair of the valve. The mechanisms of such valve are subject to breakdowns, usually when the need for the mechanism is critical.

According to the present invention there is provided a manually operated remotely controlled valve which utilizes a rotatable, flexible, elongated member secured to the valve stem at one end and in a remote position at the other end. A handle on the end of the member permits rotation of the valve member so that it moves toward and away from the seat as desired. By using a sheathed elongated flexible member, the actuating member for the valve may be completely enclosed, and protected from the atmosphere surrounding the valve and the fluids passing through the valve. The flexible member may be extended around corners and pass through walls or partitions and provide a means for operating the valve.

It is, therefore, among the objects and advantages of the invention to provide a remotely controlled, manually operated valve.

It is a further object of the invention to provide an improved manually operated remote controlled valve utilizing a flexible elongated member for rotating the rotatable valve member of the valve.

These and other objects and advantages of the invention may be readily ascertained by referring to the following description and appended illustrations in which:

FIG. 1 is a generally schematic side elevational view of one form of the invention in use in a fluid system;

FIG. 2 is a cross-sectional side elevation of a 90° valve according to the invention;

FIG. 3 is a side elevational view in cross section of a modified form of valve for use in the invention; and FIG. 4 is a plan view of an operating handle according to the invention.

As illustrated in FIG. 1, a tank 10 is provided with a bottom outlet 12, which is controlled by a 90° valve 14, includes a fluid line 16 extending away from the tank. A flexible valve actuator means 18 attached to and extends from the valve through a partition 20 to a manipulating handle 22. The distance covered by the flexible actuator 18 is determined by the layout of the fluid line, and as explained below, the flexible actuator may be bent around corners as may be required or at the desires of the designer. The remotely controlled valve as illustrated provides means for opening and closing the drain of the tank 10. However, a valve, according to the invention, may be readily placed in a line for controlling the passage of fluid through the line whether from a tank or otherwise. The tank is merely illustrative of a use for the valve.

One form of valve is illustrated in FIG. 2, wherein a valve body 30 has an inlet 31, which is externally threaded at 32 for connection in a line, and an outlet 33, which may also be threaded if desired. Either inlet or outlet may be provided with any other connection means for a fluid line. The inlet 31 passes a valve seat 34 into communication with a chamber 35, and subsequently through the outlet 36 in the member 33. A rotatable valve member 38 is threadedly engaged at 39 with a threaded valve passage in the valve body 30. A packing box 40 surrounds the outer end of a valve stem 41 which is connected to the valve member 38, and a cap 43 bearing on a pressure ring 44 provides means for sealing the packing around the stem of the valve to prevent leakage therethrough. Secured to the valve stem is a flexible rod or cable 46 mounted in a flexible sheath 47, and an end fitting 48 on the sheath extends under the cap 43 and is held in position thereby. When connected in a fluid line rotation of the cable 46 rotates the valve member 38, which by virtue of the threads 39, moves the valve member towards and away from the valve seat 34 opening or closing the valve.

The valve illustrated in FIG. 3, is an in-line valve for a fluid line. The valve includes a threaded inlet 50 and a threaded outlet 51 at the opposite side. A barrier 53 separates the inlet from the outlet, and a passage 54 provides for a flow of fluid from the inlet to the outlet, and a valve seat 57 circumscribes the outlet side of the passage. A valve member 55 having a relatively soft seat 56 is arranged to seal on the valve seat 57 on the outlet side of the passage 54. A stem 58 is integrally attached to the valve member 56 and it includes a threaded section 59 which is threadedly mounted in a threaded section 60 of the valve body. A packing gland 61, held in place by a bushing 62 which is threaded internally and externally, seals against the stem 58. A cap 63 mounted on the bushing 62 is arranged to hold a fitting 64, having a flange 65 seating under the cap 63. The fitting 64 is secured to a sheath 66 for a flexible rod or cable 67. The flexible cable 67 is secured to the stem 58 as by welding or the like and freely rotates in the sheath 66, and is arranged to rotate the stem and its attached valve body 55. The arrangement provides a completely covered valve actuator. The cable 67 may be bent around obstacles and may extend through a partition 70, and the sheath 66 preferably terminates at and is secured to the wall 70. A handle 72 is mounted on the cable 67 to provide for rotation of the cable and its attached valve stem. A pin 73 is arranged to pass through openings 74 in the handle 72 and into a recess 75 in the partition to provide a lock for the valve and maintain tension on the cable biasing the valve member 55 in closed position. As the cable 67 is flexible the handle 72 may be rotated until the valve 55 seats snugly on the seat 57 and by turning the valve further past the point of closure, torque is introduced into the cable 67 which is transmitted to he valve stem inducing a positive closing force on the valve member 55.

The size of valve useful for the present invention may be any size which may be conveniently included in a fluid line, and generally includes valves in the ⅛ to 10-inch range. The size of the flexible cable 67 is, of course, determined by the size of the valve, and generally the larger the valve the larger the cable necessary to turn the valve member. The handle, likewise, should be sized to fit the cable to provide adequate torque for turning the valve member in the valve.

We claim:

1. Manually operable, remotely controlled valve for fluid lines comprising:

a valve body having a separated inlet and an outlet, there being a passage communicating between said inlet and said outlet;

a valve seat provided on the housing around said passage;

valve means including a face sealable against said seat for opening and closing said passage;

a valve stem extending from said valve member inclusive of a threaded portion freely rotatable in a threaded portion in said valve body;

packing means around said valve stem to prevent leading of fluid between said valve stem and said valve body;

elongated flexible cable means secured to said valve stem and extending outwardly away from said valve;

a sheath covering said flexible cable, being secured at one end to said valve body and extending along the extent of said cable means;

handle means mounted on the free end of said cable means and arranged for rotating said cable for operation of said valve;

and means for holding said cable means under tension against said closed valve to thereby bias said valve in closed position.

2. Manually operable, remotely controlled valve as set out in claim 1, wherein said inlet and said outlet are at 90°.

3. Manually operable, remotely controlled valve as set out in claim 1 wherein said inlet and said outlet are in line.

4. Manually operable, remotely controlled valve as set out in claim 1 wherein said means is associated with said handle preventing rotation thereof and maintaining torque on said cable means.

5. Manually operable, remotely controlled valve as set out in claim 4 wherein said means associated with said handle is a pin extending therethrough and anchored against movement.

6. Manually operable, remotely controlled valve as set out in claim 1 wherein said sheath is sealed at said valve thereby sealing said cable and said valve stem.

7. Manually operable, remotely controlled valve as set out in claim 1 wherein said cable means passes through a partition separating said handle means from said valve.